May 20, 1969   H. P. LUDWIG   3,444,590
APPARATUS FOR THE MANUFACTURE OF SHOES
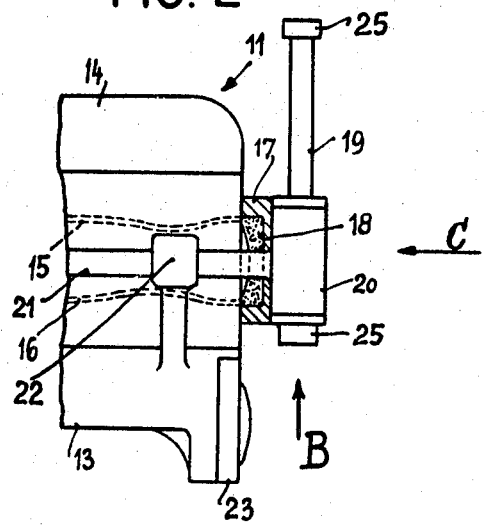
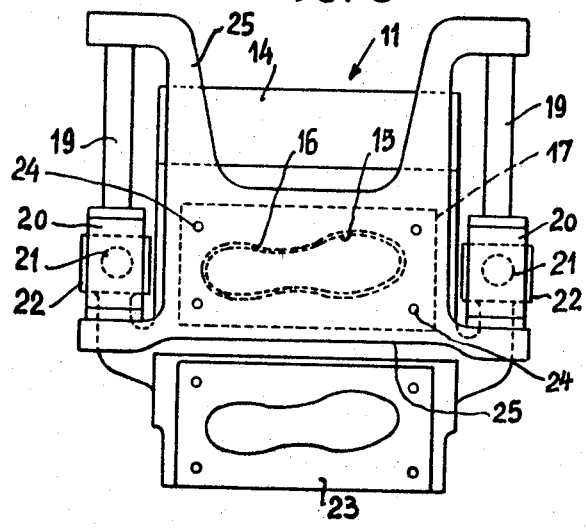
INVENTOR.
HERBERT P. LUDWIG

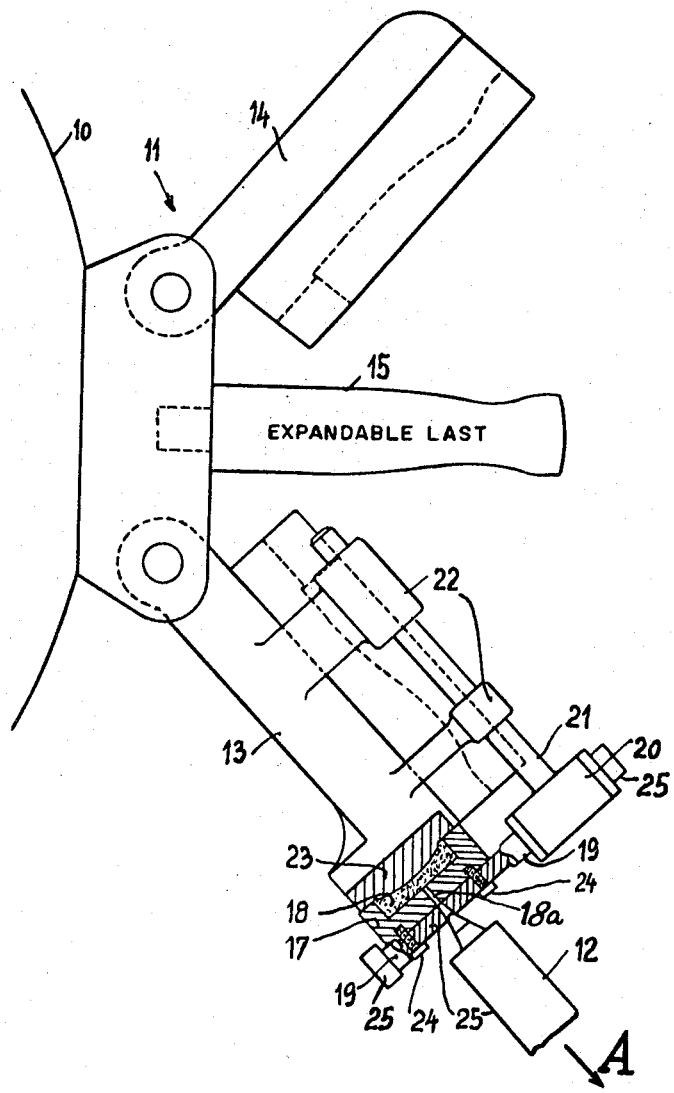
FIG. I
INVENTOR.
HERBERT P. LUDWIG

United States Patent Office 3,444,590
Patented May 20, 1969

3,444,590
APPARATUS FOR THE MANUFACTURE OF SHOES
Herbert P. Ludwig, Desmastr. 112, Usen, near
Bremen, Germany
Filed Nov. 4, 1966, Ser. No. 592,218
Claims priority, application Germany, Apr. 9, 1966,
D 49,835
Int. Cl. B29f 1/00
U.S. Cl. 18—30      4 Claims

ABSTRACT OF THE DISCLOSURE

An injection molding apparatus having a last supported within a mold that includes a pair of movable side mold parts so as to form a cavity about the last, an auxiliary bottom-forming member which is secured to one of the side mold parts, and a cover member mounted on the same side mold part for linear and lateral movement relative thereto and being provided with a further cavity having an injection opening. The cover member has two operative positions, one being adjacent the auxiliary bottom-forming member when the side mold parts are open and a second position when it is adjacent the bottom of the last when the side mold parts are closed about the last.

---

The present invention relates to an apparatus for the injection molding of plastic articles of all kinds, especially footwear such as, for example boots, from plasticizable materials such as rubber or synthetic materials and using various kinds and/or colors of plastic compounds. In particular, the apparatus is useful in the forming of multicolored footwear in which the upper is formed of one color and material, say black; and the sole is formed of another material and color, say white.

The invention furthermore is an improvement to my injection molding apparatus as disclosed in my copending application Ser. No. 360,365, filed Apr. 16, 1964, now Patent No. 3,302,244. My said copending application discloses an apparatus for the injection molding of articles from various kinds of compounds, particularly of various colors for the making of multicolored footwear, especially boots. As therein illustrated, a plurality of mold assemblies, each a complete operating unit in itself, are mounted on a turret-like support (turntable) for movement about a common center relative to one or more injection heads disposed about the center, each of which is supplied with plastic compound of a different kind and/or color, so that by aligning a mold assembly with an injection head, plastic of the kind supplied thereto may be injected into the mold. Each mold assembly comprises a support adapted to be attached to the turret and a form fixed to the support in a substantially horizontal position and extending radially outwardly therefrom with respect to the axis of rotation of the turret with the median line at the bottom, when the form is a last, parallel to the axis of rotation. A pair of side mold parts are mounted with one end of each on the support and one at each side of the form for movement toward each other into engagement about the sides of the form. Each mold part contains a recess and these recesses collectively form a cavity around the form for receiving an injection of plastic compound. A pair of end mold parts are mounted at the distal end of one of the side mold parts for angular movement with the side mold part about its axis of rotation and on the side mold part for rotation about an axis parallel to the axis of rotation of the side mold part. Each end mold part contains a cavity, the cavity in one being deeper than that in the other and these are alternately movable into a position opposite the end of the form when the side mold parts are moved into engagement to provide for a first mold cavity of shallow depth to receive a first injection in conjunction with injection of the upper into the mold cavity provided by the side mold parts, and then to superimpose a second injection at the bottom of the first injection. There is power-operable means on one of the side mold parts connected to the end mold parts which is operable to move one or the other into a position opposite the ends of the side mold parts when the latter are engaged, and power-operable means operable to effect radial movement of the end mold part that is opposite the ends of the side mold parts when the latter are engaged to bring the end mold part into engagement with the ends of the side mold parts. The power-operable means for effecting radial movement of the end mold part is operative through a first displacement of the end mold part to disengage it from the ends of the side mold parts without releasing the locking means to enable moving the alternate end mold parts into position without opening the side mold parts, and following the second injection a further distance to release the locking means to enable moving the side mold parts away from each other so that the finished article may be removed from the form. Power-operable means is also mounted on the support and connected to the side mold parts for moving them into and out of engagement about the form.

In the application of the said aforementioned apparatus, especially when used for the injection molding of articles from rubber, it became evident that unusually high pressures were being developed in the upper forming cavity which pressures exerted forces tending to separate the side mold parts. In an effort to counter this tendency, it became necessary to construct such injection molding apparatus particularly strong and heavy, so as to accommodate the high pressures required for the injection molding of rubber articles. It became also evident that the unit time for the injection molding of such articles was relatively long since the injection molding of the upper and the outsole had to be carried out in two consecutive steps, i.e., first injecting the upper and the insole and then injecting the outsole onto the insole. Such unit time was particularly long since the injection forming of the thicker outsole required a correspondingly longer time to form than the thinner upper and insole and yet, the forming of the outsole had to first await the completion of the injection forming of the upper and the insole.

It is, therefore, an object of the present invention to provide an improved apparatus for the injection molding of articles of all kinds, in particular footwear such as boots, so as to avoid the above noted difficulties heretofore encountered. More particularly, it is an object of the present invention to provide an improved apparatus for the injection molding of footwear that allows for a marked reduction in the unit time required for the injection molding of one article. It is a further object of the present invention to provide an improved injection molding apparatus for the manufacture of footwear that may be constructed from lighter materials, allowing thereby for improved efficiency of production at reduced costs.

To achieve the above objects, the improved injection molding apparatus comprises an expandable last supported within a mold in which the mold includes a pair of pivotally mounted side mold parts to form, in conjunction with the last when the same is expanded by fluid means such as air, a cavity, the thickness and shape of which corresponds to the thickness and shape of the upper of the footwear intended to be formed. To one of the side mold parts is secured an auxiliary bottom-forming member whose shape conforms to the shape of the bottom of the last when the same is in its expanded position. Cooperating with this auxiliary bottom forming member, is a cover member that is mounted on the same side mold part carrying the auxiliary bottom-forming member in a manner so as to have linear and lateral movements with respect to the side mold part. The side mold part is provided with means for effecting such linear and lateral movement of the cover member which means may be similar to the means as more fully disclosed and described in my said copending application. The cover member is furthermore being formed with a second cavity provided with an injection opening for communication with this second cavity. The linear and lateral movements of the cover member are designed for accommodating the cover member in two distinct operative positions, namely; a first injection position in which the cover member is positioned adjacent the auxiliary bottom-forming member while simultaneously the side mold parts are in an open position, and a second position in which the cover member is positioned opposite the bottom of the now expanded last and with the side mold parts being securely closed about the last.

The improved injection molding apparatus of the invention combines a last that is expandable by fluid means with an arrangement in which the outsole of the footwear to be formed is injection molded while the side mold parts are in an open position. The improved method for the injection molding of footwear of the invention is, therefore, characterized in that the injection molding of the thicker outsole is taking place simultaneously with the positioning of the upper material about the yet unexpanded last. Consequently, no additional time is lost for the mounting of the upper. The shaping and forming of the upper occurs substantially at the same time that the preformed sole is secured to the bottom of the upper. As a result, the unit production time for the making of one article is materially reduced. In addition, it is no longer required to employ the sturdy construction to keep the side mold parts together during the injection molding of rubber articles which can, according to the method of the invention, be now produced by using apparatus of lighter construction. The resultant apparatus is thus both less heavy and less expensive and yet no separation of the side mold parts occurs during injection.

The aforementioned method and apparatus make it possible to produce plastic articles of various plastic compounds by means of a simple, inexpensive and yet efficient apparatus of compact construction.

The invention will now be described in detail with reference to the accompanying drawings, which show an example of a preferred execution of the invention by means of an apparatus for the production of footwear with a different color upper and sole:

FIG. 1 is a plan view, partly in section, of an injection molding apparatus constructed in accordance with and embodying the present invention, and in particular showing, in conjunction with a fragmentary portion of an injection head, the injection of an outsole at a time when the side mold parts are open;

FIG. 2 is a plan view, partly in section, of a fragmentary portion of the apparatus shown in FIG. 1 at a time when the previously injection molded preformed outsole is being attached to an upper and with the side mold parts being in a closed position; and FIG. 3 is an elevational end view of the apparatus as viewed from the direction indicated by the arrow C in FIG. 2.

The injection molding apparatus according to the invention, comprises a mold carrier assembly 11, a plurality of which, each a complete operating unit in itself, may be secured to a turret-like support such as a turntable 10 in known manner. Each of these mold cover assemblies 11 are designed to rotate with the turntable 10 about a vertical axis so as to index successive mold assemblies relative to a radially positioned nozzle of a stationary injection head 12 to dispose one after another in a position for engagement with the nozzle for injection of a plastic compound.

The mold carrier assemblies 11 essentially consist of a pair of side mold parts 13 and 14 pivotally mounted about a last 15. Although as herein shown, each of the side mold parts 13 and 14 is mounted about its own individual axis, it should be understood that if desired, both mold parts may be mounted about an identical pivoting axis, substantially as disclosed in my said copending application Ser. No. 360,365. The side mold parts 13 and 14 furthermore are provided with removably mounted mold members in the same manner as disclosed in my said copending application to define, in conjunction with the outer surface of the last 15, a cavity 16 whose thickness corresponds to the thickness of the upper to be formed.

In contrast to the apparatus disclosed in my said copending application, the last 15 of the present invention is an expandable last by fluid means (not shown) so that it may be blown up to its desired final shape from a partially collapsed condition, the purpose of which will be more fully adverted to below. The power for such fluid means to effect the expansion of the last 15 may conveniently be provided by the fluid power means already present in the turntable 10, as is well known to those skilled in the art.

In the free end of the side mold part 13, there is provided an auxiliary bottom forming member 23 whose shape is designed to correspond to the shape of the bottom of the expandable last 15 when the same is in its expanded position. On the same side mold part 13 is mounted, for linear and lateral movement with respect thereto, a cover member 17. This cover member 17 is provided with a second, sole-forming cavity 18, having an injection opening 18a.

Preferably, the cover member 17 is removably secured to a platen 25 by means of suitable bolts 24. This will enable the easy exchange of cover members having different depths of sole-forming cavities so as to accommodate the apparatus for various thicknesses of outsoles to be formed. Platen 25 is provided with a pair of parallel mounted bars 19, designed for lateral movement with respect to the bottom of the last 15 within suitable brackets 20. The brackets 20 are, in turn, secured to the free ends of a pair of rods 21 mounted for linear movement (parallel with the side mold part 13) within suitable guide and supporting members 22. Such linear movement of the rods 21 may be effected in like manner by power operable means (not shown herein) as more fully disclosed in my said copending application Ser. No. 360,365. The lateral motion to be imparted to the pair of bars 19 may be effected by using fluid means (not shown) such as air in known manner so as to move the bars 19 within the brackets 20 from one terminal position to the other. Also, the cover member 17 may, if desired, be directly secured to the bars 19. Such an arrangement, however, will not allow for the convenient interchange of cover members.

The operation of the injection molding apparatus of the invention is as follows. A particular mold carrier assembly 11 is indexed into an injection position with respect to an injection head 12, as shown in FIG. 1. At this time, the cover member 17, which has two operative positions, is in its first injection position opposite the auxiliary bottom-forming member 23, as may be best observed in FIG. 1. The injection head 12 is brought into injection position by its nozzle making contact with the injection opening 18a of the cover member. It should be noted that at this time, the side mold parts 13 and 14 are in an open position. Simultaneously with the injection preforming of the outsole in the sole-forming cavity 18, an upper, preferably formed of another compound and of different color, is positioned about the unexpanded last 15.

Following completion of the injection of the sole-forming compound into the cavity 18, the injection head 12 is disengaged from the injection opening 18a by withdrawal in the direction indicated by the arrow A, the side mold parts 13 and 14 are closed, the rods 21 are moved linearly in a radial direction away from the turntable 10 a distance sufficient to disengage the preformed sole within the cavity 18 from the auxiliary bottom forming member 23 and the bars 19 are imparted a lateral motion in a direction shown by the arrow B so as to bring the cover member 17 into its second operative position opposite the bottom of the last 15, as depicted in FIG. 2. At this point, the expandable last 15 is caused to expand so as to shape and form the upper within the first mold cavity 16 and the preformed sole member is now firmly united to the bottom of the upper.

Concurrent with this operation, i.e., following the termination of the injection preforming of the outsole within cavity 18 and during the time that the above described steps take place when the side mold parts 13 and 14 are closed the turntable 10 has indexed one step so as to bring another mold carrier assembly 11 into injection alignment with the injection head 12.

The above described method and apparatus thus make possible the production of plastic and rubber articles from various plastic and rubber compounds and colors by means of a simple, inexpensive and yet efficient apparatus of light and compact construction.

It should be understood that the present disclosure is for the purpose of illustration only and that this invention includes all modifications and equivalents which fall within the appended claims.

What is claimed is:
1. Injection molding apparatus comprising a last supported within a mold, said mold including a pair of side mold parts pivotally mounted about said last to form, in conjunction therewith, a cavity, an auxiliary bottom-forming member secured to one of said side mold parts, a cover member mounted on said last mentioned side mold part for linear and lateral movement relative thereto, said cover member being provided with a second cavity having an injection opening; and being further characterized in that said cover member is having two operative positions, a first injection position when said cover member is adjacent said auxiliary bottom-forming member with said side mold parts being open, and a second position when said cover member is adjacent the bottom of said last with said side mold parts being closed.

2. The injection molding apparatus as defined in claim 1 in which said last is expandable.

3. The injection molding apparatus as defined in claim 1, and provided with a fluid means for effecting expansion of said last.

4. Injection molding apparatus comprising an expandable last supported within a mold, said mold including a pair of pivotally mounted side mold parts to form, in conjunction with said last, a cavity, an auxiliary bottom-forming member secured to one of said side mold parts, a cover member mounted on said last-mentioned side mold part for linear and lateral movements with respect thereto, means for effecting said linear and lateral movement of said cover member, said cover member being formed with a second cavity having an injection opening, said cover member having two operative positions, a first injection position opposite said auxiliary bottom-forming member and with said side mold parts being open, and a second position opposite the bottom of said last with said side mold parts being closed about said last.

References Cited
UNITED STATES PATENTS

| | | | |
|---|---|---|---|
| 3,128,505 | 4/1964 | Ludwig. | |
| 3,302,243 | 2/1967 | Ludwig | 18—30 |
| 3,302,244 | 2/1967 | Ludwig | 18—30 |
| 3,372,415 | 3/1968 | King | 18—34 X |

WILBUR L. McBAY, *Primary Examiner.*

U.S. Cl. X.R.

18—42